(12) United States Patent
Robinson et al.

(10) Patent No.: US 8,379,913 B1
(45) Date of Patent: Feb. 19, 2013

(54) ADAPTIVE IMAGE ACQUISITION AND PROCESSING WITH IMAGE ANALYSIS FEEDBACK

(75) Inventors: M. Dirk Robinson, Menlo Park, CA (US); Mark Robertson, Cupertino, CA (US); Hadar Isaac, Los Altos, CA (US); Oliver Guinan, Palo Alto, CA (US); Thomas Joseph Melendez, Mountain View, CA (US); Daniel Berkenstock, Palo Alto, CA (US); Julian Mann, Menlo Park, CA (US)

(73) Assignee: Skybox Imaging, Inc., Mountain View, CA (US)

( * ) Notice: Subject to any disclaimer, the term of this patent is extended or adjusted under 35 U.S.C. 154(b) by 0 days.

(21) Appl. No.: 13/614,050

(22) Filed: Sep. 13, 2012

Related U.S. Application Data

(63) Continuation of application No. 13/219,461, filed on Aug. 26, 2011, and a continuation of application No. 13/219,500, filed on Aug. 26, 2011.

(51) Int. Cl.
*G06K 9/00* (2006.01)
(52) U.S. Cl. .................. 382/100; 382/305; 707/918
(58) Field of Classification Search .................. 382/100, 382/325
See application file for complete search history.

(56) References Cited

U.S. PATENT DOCUMENTS

| | | |
|---|---|---|
| 6,505,146 B1 | 1/2003 | Blackmer |
| 6,850,895 B2 | 2/2005 | Brodersen et al. |
| 6,879,718 B2 | 4/2005 | Hullender |
| 7,117,192 B2 | 10/2006 | Waltz et al. |
| 7,197,459 B1 | 3/2007 | Harinarayan et al. |
| 7,356,406 B2 | 4/2008 | Harrison et al. |
| 7,373,612 B2 | 5/2008 | Risch et al. |
| 7,406,482 B2 | 7/2008 | Dorum et al. |
| 7,536,025 B2 * | 5/2009 | Folchetti et al. .............. 382/100 |
| 7,580,045 B2 | 8/2009 | Harrison et al. |
| 7,653,218 B1 | 1/2010 | Malitz et al. |
| 7,689,001 B2 | 3/2010 | Kim et al. |
| 7,801,756 B1 | 9/2010 | Harinarayan et al. |
| 7,813,596 B2 | 10/2010 | Di Bernardo et al. |
| 7,925,982 B2 | 4/2011 | Parker et al. |
| 7,940,959 B2 | 5/2011 | Rubenstein |
| 7,945,470 B1 | 5/2011 | Cohen et al. |

(Continued)

FOREIGN PATENT DOCUMENTS

| | | |
|---|---|---|
| WO | WO 2010/093423 | 8/2010 |
| WO | WO 2010/093428 | 8/2010 |

(Continued)

OTHER PUBLICATIONS

Anselin, L., et al., "GeoDa: An Introduction to Spatial Data Analysis," May 5, 2004, published in Geographical Analysis, Jan. 2006, pp. 5-22, vol. 38.

(Continued)

*Primary Examiner* — Hadi Akhavannik
(74) *Attorney, Agent, or Firm* — Knobbe, Martens, Olson & Bear, LLP

(57) ABSTRACT

Described are systems, methods, computer programs, and user interfaces for image location, acquisition, analysis, and data correlation that uses human-in-the-loop processing, Human Intelligence Tasks (HIT), and/or or automated image processing. Results obtained using image analysis are correlated to non-spatial information useful for commerce and trade. For example, images of regions of interest of the earth are used to count items (e.g., cars in a store parking lot to predict store revenues), detect events (e.g., unloading of a container ship, or evaluating the completion of a construction project), or quantify items (e.g., the water level in a reservoir, the area of a farming plot).

18 Claims, 7 Drawing Sheets

U.S. PATENT DOCUMENTS

| | | | |
|---|---|---|---|
| 8,010,407 B1 | 8/2011 | Santoro et al. | |
| 8,046,250 B1 | 10/2011 | Cohen et al. | |
| 8,046,306 B2 | 10/2011 | Stinson | |
| 8,116,596 B2 | 2/2012 | McIntyre et al. | |
| 8,121,879 B1 | 2/2012 | Cohen | |
| 8,121,888 B1 | 2/2012 | Cohen et al. | |
| 8,126,819 B1 | 2/2012 | Ersek | |
| 8,145,677 B2 | 3/2012 | Al-Shameri | |
| 8,155,391 B1 | 4/2012 | Tang et al. | |
| 8,156,136 B2 | 4/2012 | Davis et al. | |
| 8,170,897 B1 | 5/2012 | Cohen et al. | |
| 8,194,922 B2 | 6/2012 | Jamison et al. | |
| 2002/0083079 A1 | 6/2002 | Meier et al. | |
| 2003/0026485 A1 | 2/2003 | Gotsman et al. | |
| 2003/0040971 A1 | 2/2003 | Freedenberg et al. | |
| 2003/0044085 A1 | 3/2003 | Dial, Jr. et al. | |
| 2007/0180131 A1 | 8/2007 | Goldstein et al. | |
| 2008/0052638 A1 | 2/2008 | Frank et al. | |
| 2008/0059452 A1 | 3/2008 | Frank | |
| 2008/0084334 A1 | 4/2008 | Ballew | |
| 2008/0155540 A1 | 6/2008 | Mock et al. | |
| 2008/0258880 A1 | 10/2008 | Smith et al. | |
| 2009/0005968 A1 | 1/2009 | Vengroff et al. | |
| 2009/0063267 A1 | 3/2009 | Dubinko et al. | |
| 2009/0187575 A1 | 7/2009 | DaCosta | |
| 2009/0197685 A1 | 8/2009 | Shuster | |
| 2009/0232349 A1 | 9/2009 | Moses et al. | |
| 2009/0237396 A1 | 9/2009 | Venezia et al. | |
| 2009/0240652 A1 | 9/2009 | Su et al. | |
| 2009/0257620 A1* | 10/2009 | Hicks | 382/100 |
| 2009/0271719 A1 | 10/2009 | Clare et al. | |
| 2009/0313078 A1 | 12/2009 | Cross | |
| 2010/0332281 A1 | 12/2010 | Horvitz et al. | |
| 2011/0007094 A1 | 1/2011 | Nash et al. | |
| 2011/0145156 A1 | 6/2011 | Feng et al. | |
| 2011/0167343 A1 | 7/2011 | Wright et al. | |
| 2011/0279476 A1 | 11/2011 | Nielsen et al. | |
| 2011/0313779 A1 | 12/2011 | Herzog et al. | |
| 2012/0005131 A1 | 1/2012 | Horvitz et al. | |
| 2012/0020527 A1 | 1/2012 | Abileah | |
| 2012/0025975 A1 | 2/2012 | Richey et al. | |
| 2012/0069153 A1 | 3/2012 | Mochizuki et al. | |
| 2012/0093396 A1 | 4/2012 | Dai et al. | |
| 2012/0100867 A1 | 4/2012 | Liang et al. | |

FOREIGN PATENT DOCUMENTS

| | | |
|---|---|---|
| WO | WO 2012/033675 | 3/2012 |
| WO | WO 2012/043184 | 4/2012 |
| WO | WO 2012/069698 | 5/2012 |

OTHER PUBLICATIONS

Clouard, R., et al., "Human-Computer Interaction for the Generation of Image Processing Applications," Int. J. Human-Computer Studies, Apr. 2011, pp. 201-219, vol. 69, No. 4.

Hays, J., et al., "IM2GPS: Estimating Geographic Information from a Single Image," Proceedings of the IEEE Conf. on Computer Vision and Pattern Recognition, Jun. 23-28, 2008, in 8 pages.

Amazon.com, Inc. "Amazon Mechanical Turk", accessed at https://www.mturk.com/mturk/welcome on Jul. 17, 2012.

Environment Research Systems, Inc. (ESRI), "ArcGIS Map Examples", accessed at http://www.esri.com/software/arcgis/take-a-look-at-web-maps on Jul. 17, 2012.

Crowdflower, "Example: Battleship Movie Sentiment", accessed at https://senti.crowdflower.com/examples/battleship on Jul. 17, 2012.

Google, Inc. "Google Earth, View of American Museum of Natural History", accessed at http://maps.google.com on Jul. 17, 2012.

Infochimps, Inc., "Geocoding API,", accessed at www.infochimps.com/datasets/geocoding-api on Jul. 17, 2012.

Kapow Software, "Kapow Katalyst Application Integration Platform," accessed at http://kapowsoftware.com/products/kapow-katalyst-platform/ on Jul. 17, 2012.

Openstreetmap, "Free Wiki World Map," accessed at http://www.openstreetmap.org/ on Jul. 17, 2012.

Quantum GIS Project, "QGIS 1.8 Release", accessed at http://www.qgis.org/en/sponsorship/149.html on Aug. 29, 2012, in 13 pages.

United States Geological Survey, "Map Locator & Downloader," accessed at http://store.usgs.gov/b2c_usgs/usgs/maplocator/(xcm=r3standardpitrex_prd&layout=6_1_48&uiarea=2&ctype=areaDetails&carea=%24ROOT)/.do on Jul. 17, 2012.

Sowmya, A. et al.., "Modelling and Representation Issues in Automated Feature Extraction from Aerial and Satellite Images," ISPRS Journal of Photogrammetry and Remote Sensing, Feb. 2000, pp. 34-47, vol. 55, No. 1.

Wightman, D., "Crowdsourcing Human-Based Computation," Proceedings of the 6th Nordic Conference on Human-Computer Interaction, Oct. 16-20, 2010, pp. 551-560, Reykjavik, Iceland.

International Search Report and Written Opinion for Int'l App. No. PCT/US2012/051935 filed Aug. 22, 2012, mailing date Nov. 27, 2012, in 19 pages.

\* cited by examiner

ADAPTIVE IMAGE ACQUISITION AND PROCESSING WITH IMAGE ANALYSIS FEEDBACK

CROSS-REFERENCE TO RELATED APPLICATIONS

This application is a continuation of U.S. patent application Ser. No. 13/219,461, filed Aug. 26, 2011, entitled "ADAPTIVE IMAGE ACQUISITION AND PROCESSING WITH IMAGE ANALYSIS FEEDBACK," and is a continuation of U.S. patent application Ser. No. 13/219,500, filed Aug. 26, 2011, entitled "USING HUMAN INTELLIGENCE TASKS FOR PRECISE IMAGE ANALYSIS"; the disclosures of the foregoing applications are hereby incorporated by reference in their entirety so as to form a part of this specification.

FIELD OF ART

The disclosed embodiments relate to the fields of image acquisition and analysis of spatial imagery. The result of the analysis is correlated to non-spatial data, such as business activity.

BACKGROUND

Satellite image acquisition is well known in the art. Many companies such as DIGITAL GLOBE, GEOEYE, and SPOT IMAGE provide commercial satellite imagery. Existing imaging systems also allow the determination of polygons representing places on earth from satellite and other imagery. For example, geographic information systems (GIS) software tools enable experts to manually draw property lines and create cadastral data sets based on imagery. Unfortunately, polygons are not available for all the targets of interest, and as a result it is often necessary to create new polygons Automated image analysis for the determination of non-spatial characteristics is also well known and include examples like optical character recognition, face recognition, and building recognition. However, these systems often suffer inaccuracy and often have to be laboriously tuned, trained, and/or redesigned for each application.

Systems that use human workers connected over the Internet to perform imaging and other computational and analytical functions (referred to as Human Intelligence Tasks or HITs) exist, for example, AMAZON's Mechanical Turk and CROWDFLOWER. While using workers provides greater adaption to different images and applications than many automated systems, human workers can be error prone, and their processing output can be slow. Further, specialized training and software tools running on a local computer are required.

Figure 1:
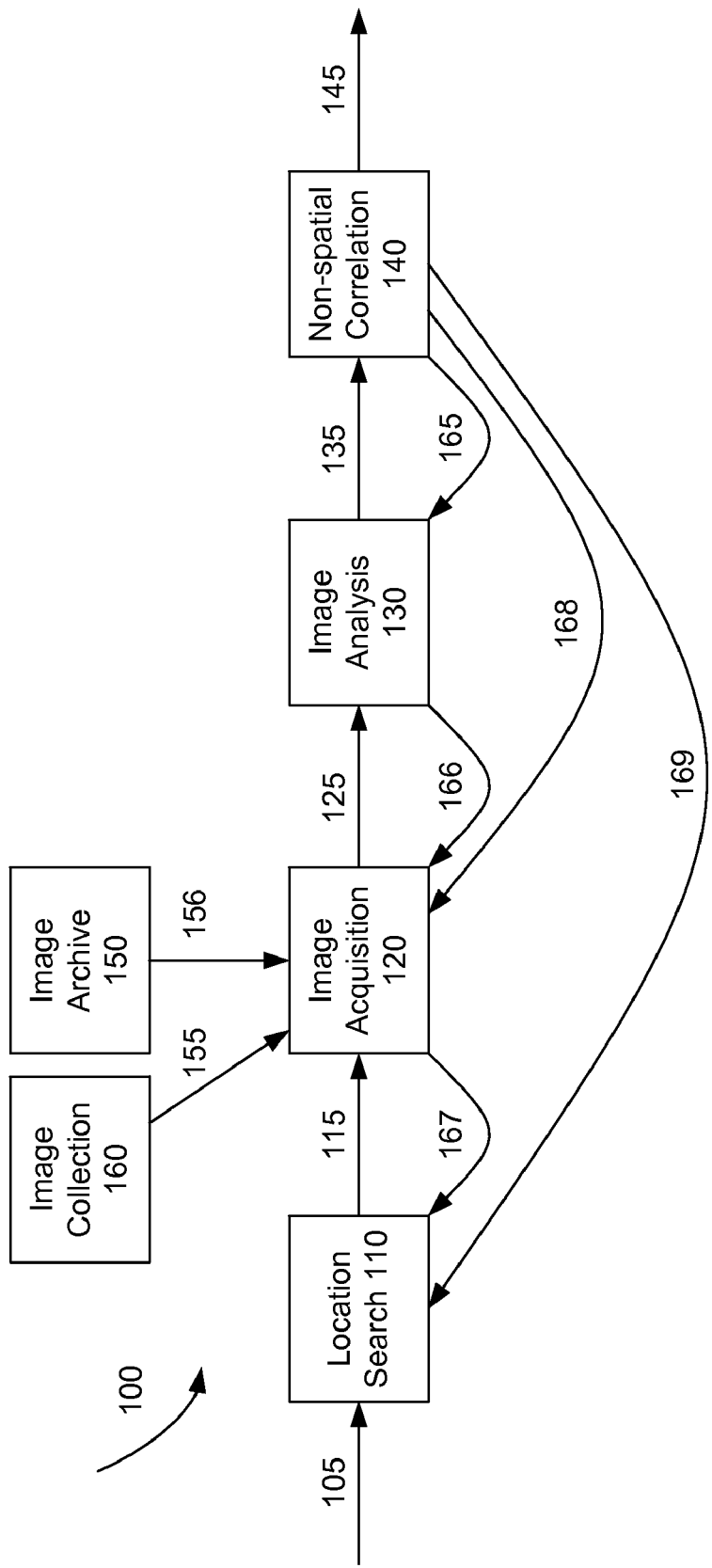
FIG. 1 shows the block diagram of system, according to one embodiment.

Like reference numerals refer to corresponding parts throughout the drawings. The figures depict various embodiments of the present invention for purposes of illustration only. One skilled in the art will readily recognize from the following discussion that alternative embodiments of the structures and methods illustrated herein may be employed without departing from the principles as described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Described are systems, methods, computer programs, and user interfaces for image location, acquisition, analysis, and data correlation that uses human-in-the-loop processing, Human Intelligence Tasks (HIT), and/or automated image processing. Results obtained via image analysis are correlated to non-spatial information useful for commerce and trade. For example, images of regions of interest of the earth are used to count items (e.g., cars in a store parking lot to predict store revenues), detect events (e.g., unloading of a container ship, or evaluating the completion of a construction project), or quantify items (e.g., the water level in a reservoir, the area of a farming plot).

The geographical coordinates of features on earth, for example a particular type of store or shipping port or reservoir, are mapped to textual descriptions. From these mappings, a polygon of interest on the surface of the earth is determined. The polygon of interest's dimensions and coordinates control an image acquisition system. This system finds relevant and timely images in an image database and/or controls devices to acquire new images of the area. With one or more images of the polygon of interest available, various image enhancement techniques may be performed. Image enhancements are performed to increase human perception and discrimination of items of interest from the background.

Enhanced images, are then presented to human workers to perform the visual analysis. Using network affordances such as AMAZON's MECHANICAL TURK, the images and the task to be performed are presented to workers via a web browser (e.g., FIREFOX) with a novel task-specific user interface (UI). This UI helps the workers organize, perform, and submit results for the task. The resulting counts are processed by analytic and statistical processes. These processes incorporate the results from many different images, and/or many results from the same image counted by different workers. The processes may include filtering functions to improve the resulting data.

Results of the processing are correlated with non-spatial data, for example economic activity data. Over time these correlations allow the results of this analysis to be used in predicting the non-spatial data. For example, the results may show that the number of cars in a store parking lot is correlated with that store's week-over-week revenues. This correlation provides a prediction of revenues given a current car count.

In some embodiments of this system, feedback from the image acquisition, image analysis, and non-spatial correlation is used to improve the data collected. For example, feedback may be used to refine the dimensions of the polygons of interest, the quality of the imagery, and the accuracy of the image analysis.

Imaging

FIG. 1 shows a block diagram of one example of an imaging system 100, according to one embodiment. Input control parameters 105 specify the operation of the system. These parameters include textual non-spatial descriptions of areas of interest on earth. Examples of non-spatial descriptions include "Home Depot store parking lots in California," the "Port of Oakland," and "Crystal Springs Reservoir." Other control parameters may include the type of data to be collected (e.g., cars in parking lots, ships by docks, area of water), time and date ranges for image collection, the frequency of derived data measurement, or requirements for confidence scores of derived data.

The location search subsystem 110 determines polygons of features of interest on the earth. The geographical coordinates of features on earth, for example a particular type of store or shipping port or reservoir, are mapped to textual descriptions. The geographical coordinates may be obtained from geographical databases or prior imagery of the site, for example. The textual descriptions may, for example be the Home Depot stores in California. From these mappings, a polygon of interest on the surface of the earth is determined.

The location search subsystem 110 is also configured to receive feedback 169 from the non-spatial correlation subsystem 140. This may be the case where the non-spatial correlation subsystem 140 determines that additional information needs to be obtained by the location search subsystem 110. For example, the non-spatial correlation subsystem 140 may determine that the correlation between the count at a given location and the relevant economic data is inconsistent, suggesting a need for more or different data that can be obtained by location search subsystem 110. The feedback provided to the location search subsystem 110 may include an updated search location, thereby resulting in different locations being searched for use in obtaining results.

The polygons of interest are passed 115 to the image acquisition subsystem 120. The image acquisition subsystem 120 determines the quality and appropriateness of the polygons based on real images. For example, the image acquisition subsystem 120 may determine that a polygon is enlarged, shifted or refined relative to the real images. This polygon discrepancy information may be provided as feedback 167 to the location search subsystem 110 to improve the quality and appropriateness of polygons determined by the location search subsystem 110.

The image acquisition subsystem 120 also uses the spatial information describing the polygons of interest and the other control parameters to acquire an image, or set of images, that satisfy the control parameters for each polygon of interest. In some cases, image data is accessed from an existing image archive 150, such as DIGITAL GLOBE, GEOEYE, USGS, or ISRO. Additionally, if needed, these images are sourced from social image archives such as GOOGLE MAPS or FLICKR. In other cases, image data is obtained from an image collection subsystem 160, such as a satellite or satellite network, array of security cameras, or other purpose built image acquisition systems. Images may be acquired from either or both of the image archives 150 and image collection 160 depending on which images are the most economical and appropriate for the task.

In some cases, feedback information about the quality and alignment of the imagery is passed back 166 to the image acquisition subsystem 120. Based on this feedback, the image acquisition subsystem 120 will acquire more imagery. The image acquisition subsystem 110 is also configured to receive feedback 168 from the non-spatial correlation subsystem 140. The feedback may be used to alter the acquisition of images. For example the feedback may be used to change the frequency or time of day of image acquisition.

The acquired images are sent 125 to the image analysis subsystem 130. The image analysis subsystem 130 evaluates the images, enhances and prepares the images, presents the images to the human workers with a task specific user interface, statistically processes the results, and passes those results 135 to the non-spatial correlation subsystem 140.

The image analysis subsystem 130 includes a number of methods for improving accuracy and throughput in image analysis. The capabilities of the image analysis subsystem 130 are described with respect to the example of performing image analysis to count the number of cars in a store parking lot. However, the principles discussed are general and can be applied to many different image analysis tasks. Image enhancement and analysis may be performed with automated systems and/or human-in-the-loop systems. In some cases, the image analysis subsystem 130 receives feedback information 165 about the accuracy and adequacy of its results from the non-spatial correlation subsystem 140. In these cases, the data is modified, or the image analysis is re-performed according to the feedback information.

The non-spatial correlation subsystem 140 receives result data 135 from the image analysis subsystem 130, and calculates temporal correlation between that data and economic data of interest. For example, the count of cars in a store parking lot can be correlated with the weekly sales revenues from that store. In another example, the length of time ships take to unload can be correlated with the volume of goods transported through a port. Another example is that the width of water in a reservoir can be correlated with the value of crops in an area downstream.

The non-spatial correlation subsystem 140 collects correlation data over time. The collected data is used to create a prediction of future economic metrics based on previously collected correlations between image analysis data and economic data. For example, weekly sales revenues can be predicted from the count of the number of cars in a store's parking lot.

Location Search

Figure 2:
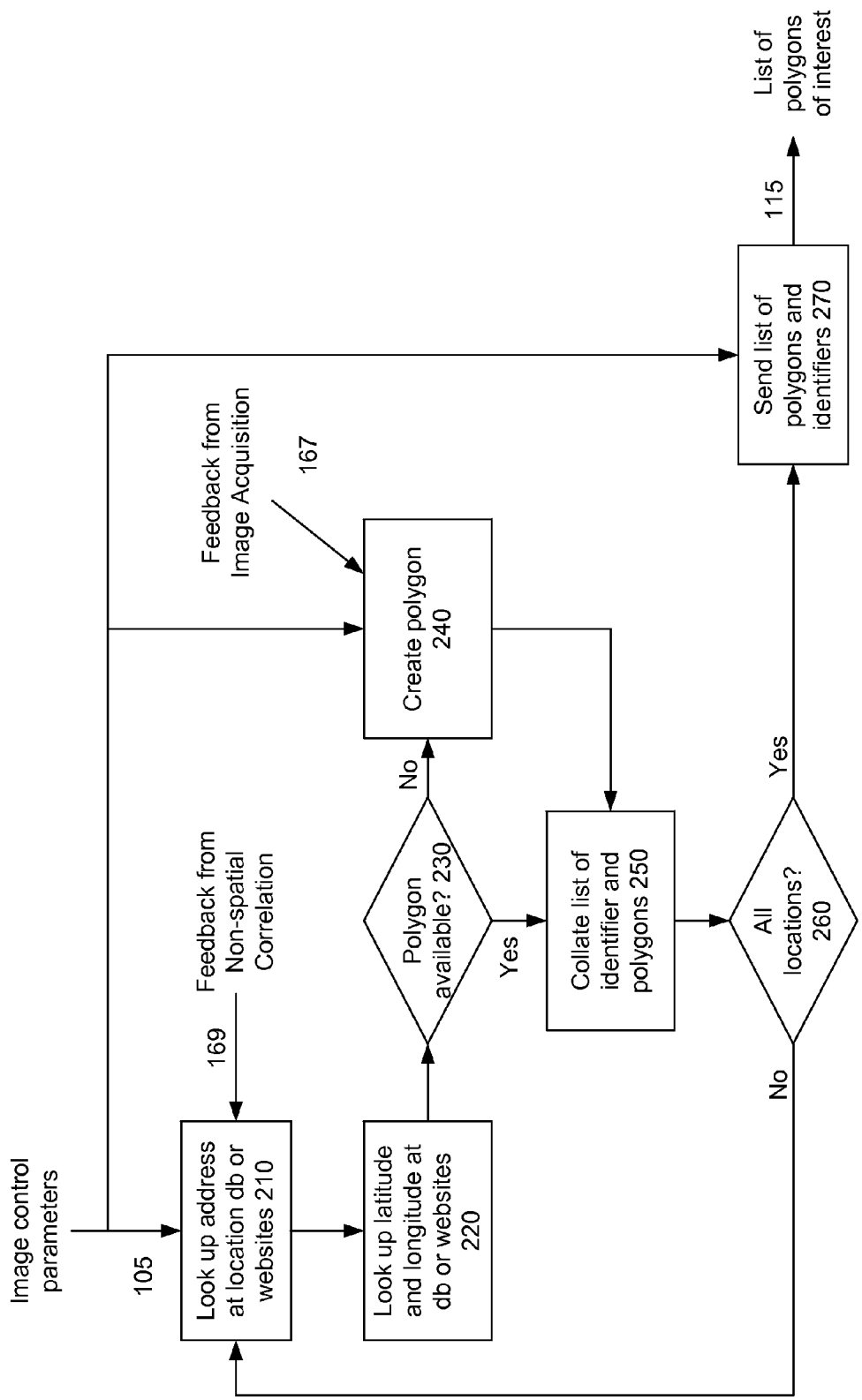
FIG. 2 describes a decision flow for location search, according to one embodiment.

Turning now to FIG. 2, it illustrates one example of steps of the Location Search 110 subsystem, according to one embodiment. Input control parameters 105 are parsed to obtain location information that is presented to a database or a website of addresses 210 to obtain a list of street address locations. Examples of databases include the yellow pages and local government business listings. Examples of web sites include business websites, search engines like GOOGLE (www.google.com), or review sites like YELP (www.yelp.com). For example, the location information query "Home Depot stores in California" is parsed and presented to the store locator section of the HOME DEPOT website (www.homedepot.com). From this list of stores, store identification numbers and street addresses in California are generated.

A geological database is queried 220 with the list of street address locations. Examples of geological databases and websites include GOOGLE EARTH, OPEN STREET MAPS, INFO CHIMPS, and the United States Geological Survey. From these geological databases latitude and longitude coordinates on earth for each location are derived. In some cases, the derived coordinates comprise single points on earth, and in other cases the derived coordinates also provide polygons including the latitudes and longitudes of the boundaries of the location. For each location, polygons are determined if they are not provided by the geological database. Cases where polygons are provided directly from the database query 230 are more convenient. For example, using Open Street Map, the Home Depot store #639 at 2 Colma Boulevard in Colma, Calif. has a polygon drawn around the store and the parking lot. The corner points of this polygon are obtained directly from the query.

In other cases, no such polygon is available and it instead obtained or created 240 based on the derived coordinates using the image acquisition subsystem 120. In some embodiments, the characteristic of the task to be performed based on the data to be correlated determines the expected size and shape of the polygon. For example, the size and shape of a store parking lot may be estimated using a template, where the border of the template determines the boundaries of the polygon. Placing that template around the center point is sometimes sufficient to create the polygon. In other embodiments, the polygons are created by hand using a HIT, or by estimating the area around a center latitude and longitude 240.

After the polygon is complete the boundaries of the polygon are associated with a location identifier in a list. The system iterates on all locations 250 until the list is complete. The list is compiled, combined with the input control parameters 270 and sent 115 to the image acquisition system.

In some cases, feedback from the image acquisition subsystem 167 controls the creation of polygons for certain images. In FIG. 2, although 167 is shown as impacting the polygon creation process 240, in some implementations it is constructed as a full pass though the entire process, thus feedback from the image acquisition system 120 is passed directly to the location search block 110.

In some cases, feedback from the non-spatial correlation subsystem 169 creates new locations of interest to include in the location search. Using the counting cars in the store parking lot example, a count from a nearby competitive store could be used as a normalizing factor. In this example, the feedback 169 would include instructions to include the competitor store parking lot in the list of locations.

Generally, location addresses 210 and geographical latitude and longitude 220 may be accessed using a database or website Application Programmer's Interface (API). Alternatively, website data may be extracted using "screen scraping" tools, such as KAPOW SOFTWARE (kapowsoftware.com).

Image Acquisition

Figure 3:
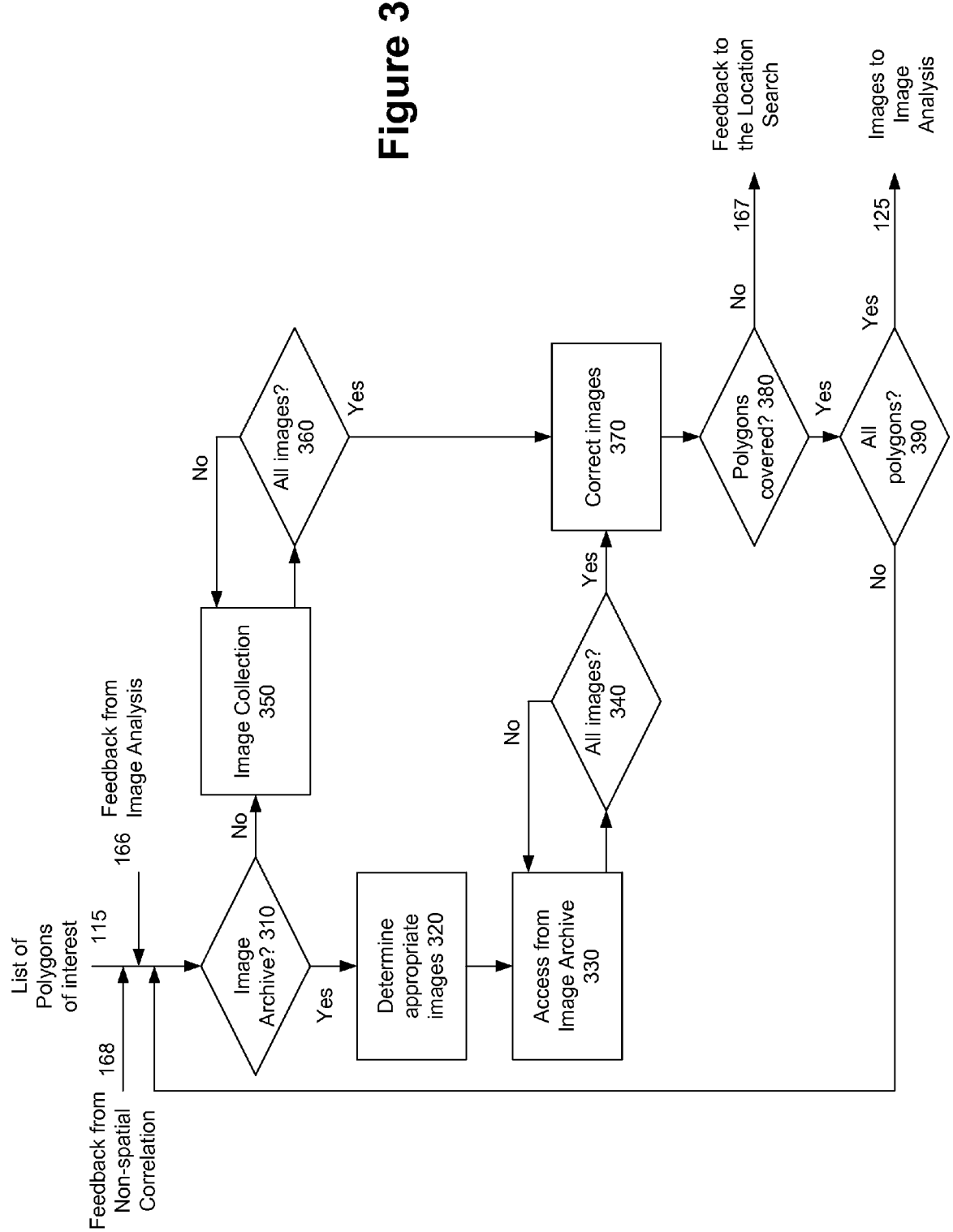
FIG. 3 describes a decision flow for image acquisition, according to one embodiment.

FIG. 3 shows the steps of the image acquisition subsystem 120, according to one embodiment. Given a list of polygons of interest 115 and a timeliness constraint, the image acquisition subsystem 120 determines if timely, appropriate and quality images are available in image archives 310 for each polygon. If available, the system then determines which image, or images, covers each polygon 320, and then accesses those images in the Image Archive 330. In some cases a polygon extends over more than one image. The system iterates 340 until images for each polygon are accessed, and until all the locations have appropriate imagery 390 such that the surface area of all polygons of interest is covered by obtained Imagery.

In the case where appropriate images are not available in image archive 310 for one or more polygons, the image collection subsystem 350 is used to collect the images. New images may also be collected if the existing images are insufficient in quality or detail, or if they are not timely with respect to the timeliness constraint. The image collection subsystem 350 controls any number of imaging systems such as satellites, sensor networks, security cameras, roving camera systems, and other mobile or stationary imaging systems. The imaging collection system 350 iterates image collection 360 until all the necessary images are accessed. In some cases, a mixture of existing images from the image archive 310 and newly collected images from the image collection subsystem 350 are used to cover a single polygon (not shown in FIG. 3).

Images are corrected 370 for angular distortion or orthorectified to account for surface topology. For some polygons, a number of images are composited, stitched together, and/or cropped to cover the polygon of interest. The image acquisition subsystem 320 evaluates whether the location is properly represented by the polygon described and the images available. In some cases, feedback is provided to the location search 380 with suggested alterations for the polygon description.

Feedback from the image analysis subsystem 166 to the image acquisition subsystem provides information about the quality of the images. For example, if the existing imagery does not contain sufficient resolution or information content to accurately produce derived data from an image, feedback 166 instructs that a new image of the scene is to be acquired.

Feedback from the non-spatial correlation subsystem 168 provides control instructions regarding the frequency and/or timing with which imagery is acquired. For example, the non-spatial correlation subsystem 140 may have determined that data is not sampled often enough (under-sampled). The feedback 168 informs the image acquisition subsystem 120 is to acquire images for a given location more frequently.

Images are captured in the visible wavelengths. In some cases, images are also captured in the near infrared (NIR) as well as the visible wavelengths in order to assist in the disambiguation of desired objects from vegetation during image analysis.

Image Analysis

Figure 4:
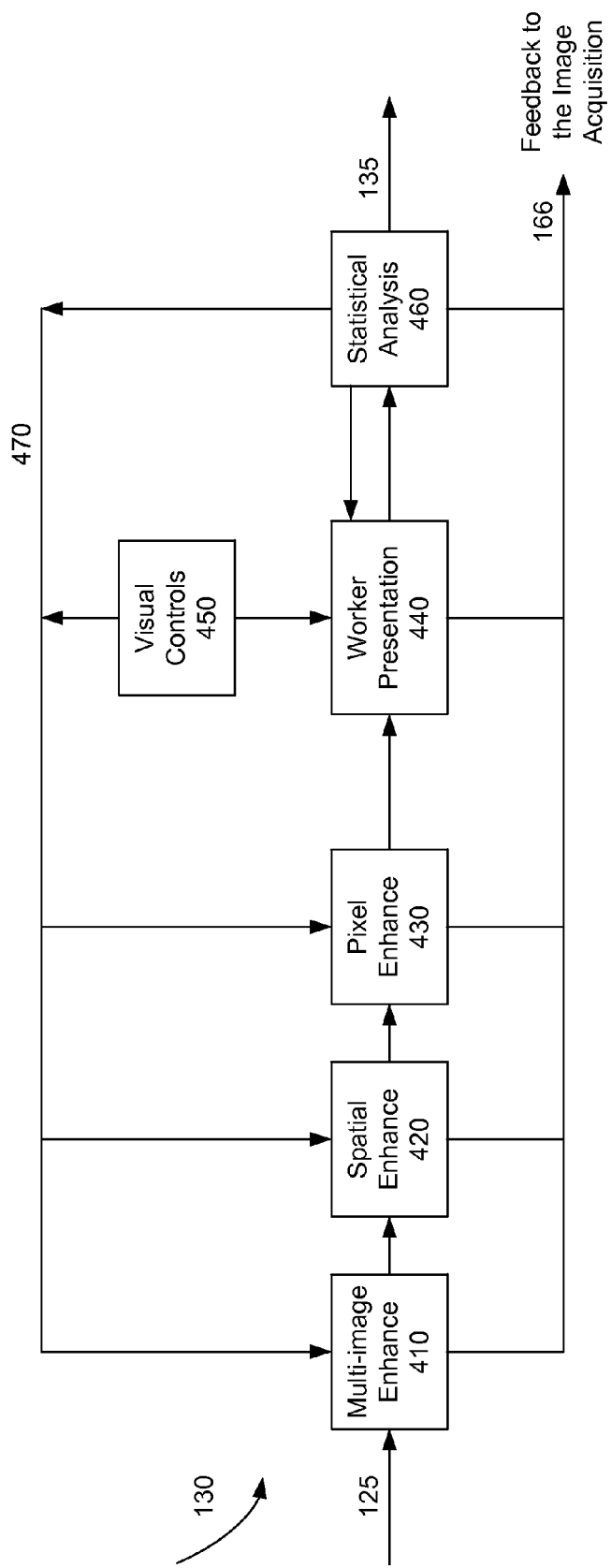
FIG. 4 describes a decision flow for image analysis using HIT, according to one embodiment.

FIG. 4 shows a block diagram of the image analysis subsystem 130, according to one embodiment. The image analysis subsystem 130 processes images to create a spatial visualization of the polygon of interest. The spatial visualization is designed to useful for the HIT processing, and is not necessary the most visually pleasing illustration of the polygon of interest. Image processing can include multi-image 410, spatial 420, and pixel 430 type image enhancements.

Multiple images 410 are used if no single image covers a given polygon. In such a case multiple images are stitched together using geographic coordinates and image derived markers. Multiple images may also be used to correct images that have the wrong visualization angle. Additionally, in the event the resolution of a single image is not be high enough multiple images may be combined with super-resolution techniques to achieve a higher resolution. In order to determine which images will be used as representative of a polygon of interest, a simply selection process may be used. In the simple selection process, given a number of images of a location that were taken within a designated time window the best image for the task to be completed is chosen. The selection may be based one or more parameters such as resolution, contrast, polygon coverage, lack of cloud cover and other weather effects.

Spatial image processing 420 may also be performed to more clearly visualize the shape, color and context of objects for workers viewing the images to accomplish tasks. Spatial image processing 420 includes filtering for sharpening (e.g., unsharp masking), noise reduction, and contrast enhancement, color balancing, contrast enhancement, and sharpening, for example. In some cases, regions of an image outside of the polygon of interest are modified to provide workers with imagery context while discouraging worker analysis of this part of the image.

Pixel enhancement processing 430 may also be performed to more clearly visualize the shape, color and context of objects for workers viewing the images to accomplish tasks. Pixel enhancement processing 420 includes color mapping and contrast adjustment. Pixel enhancement processing 420, for example, may alter images so that natural vegetation (e.g., trees) and other objects such as man made structures (e.g., awnings), are not confused with cars.

In some cases, some portions of an image, even within polygons, are darkened or blurred to draw attention to the region of interest. For example, the region around a parking lot of cars may be darkened. In some cases, further processing is used to enhance potential targets of interest. For example, classic and specialized image sharpening algorithms are used to enhance the contrast between cars and asphalt or cement pavement in parking lots to enable better discrimination of car targets. In some cases, basic automatic image analysis identifies objects and regions that are unimportant for the task. For example, the green color of vegetation may be enhanced to distinguish it from vehicles.

The image analysis subsystem 130 receives real-time and non-real-time feedback 470, 165 to assist with image enhancement. The feedback may be provided as a result of an accuracy calculation performed by statistical analysis 460, and/or based on worker adjustment of visual controls 450.

In some cases, visual controls 450 allow adjustment of image enhancement functions such as multi-image 410, spatial 420, and pixel 430 type image enhancements. In some cases, the settings for a worker are used to as preferred settings for only that worker. In other cases, an aggregation of the settings from several workers are used to create preferred settings for many or all other workers. In other cases, the settings for one image, or one location, or one source of images, or particular type of image are used to create preferred settings for that particular image, location, image source, or type of image.

The visual controls 450 allow the worker to apply simple image processing steps to modify the image to better suit the worker's needs in performing the task. Allowed modifications include changing the sharpness, color, and contrast of an image as well as zooming and panning the image, for example.

The worker presentation 440 is a task-specific user interface that presents workers with a visualization of analyzed imagery and a HIT tool set for quick and repeatable production of derived data from the imagery using HIT. The worker presentation 440 may be web browser based. The worker presentation also allows workers to compare images with other images for detecting changes between the two images or for locating items on maps. In the counting cars example, the worker presentation includes a click marker system so that the worker sees what has been counted and what is yet to count. These markers can be removed and corrected by the worker, as necessary, before the count is submitted for statistical analysis 460.

After the worker completes the HIT, the statistical analysis subsystem 460 performs quality control measurements. These measurements compare statistics regarding the results obtained by a number of different workers (e.g., 100) for counts for the same image and/or for a number of different images from the same worker.

In some cases, one or more of the enhancement processing subsystems 410, 420, 430 and the statistical analysis subsystem 460 performs an evaluation to determine if the analyzed images lead are leading to acceptable results being derived by the workers. The results of the evaluation are provided as feedback 166 to the image acquisition subsystem 120.

Human Intelligence Task

Figure 5:
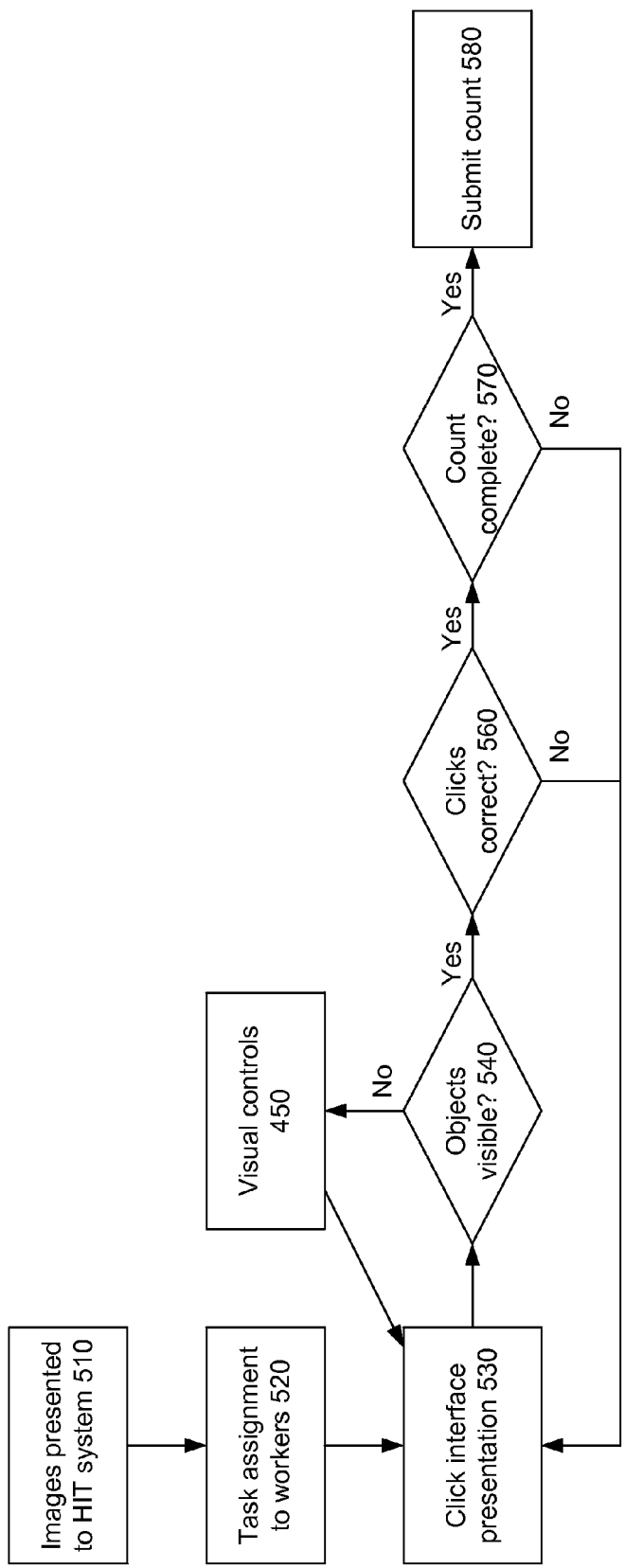
FIG. 5 describes a decision flow for interfacing with a worker performing image analysis, according to one embodiment.

FIG. 5 shows an example worker task flow and worker presentation affordances, according to one embodiment. At a high level, the typical workflow of a worker is to receive a set of processed images along with a set of instructions as to how to complete the job. The worker performs the task and then clicks on a submit button to send the completed task back to the system.

The images and instructions are presented to workers through the HIT system 510. A HIT system is a network-based distributed data processing system. Data is presented to the workers via a web browser. The worker processes that data according to the instructions and submits an answer. Workers can be located anywhere in the world with network access, and work with any type of network device including a browser. Sometimes workers are employed by a single company who then contracts the work out to customers. Other times workers are free agents, paid for each piece of data they process. Examples of this type of system include AMAZON's MECHANICAL TURK (www.mturk.com).

Each task is assigned to multiple workers 520, where the number of workers is determined according to the accuracy desired. Accuracy is also a function of the task, the interface, the image, and the quality of the workers. For the car counting example, empirical studies over a number of parking lot images indicate that the number of required workers per image to obtain the correct count of the number of cars within a single standard deviation is 25 workers. A similar empirical analysis can be performed for other tasks, interfaces, and images to determine the appropriate number of workers to ensure the desired accuracy.

The interface for the counting system includes specific instructions for the task, a click marking system, visual controls, and correction editing. For the counting cars example, the specific instructions may be as follows: "You will be shown a photograph of a parking lot taken from the sky. Your task is to identify and count all the cars in the image by clicking on the center of each one time. Each click will leave behind a visual marker and increase the total count by one. If you make an error, you can remove the click by clicking on it when the cursor changes to the image of a hand. Note, when you remove a marker, the total count will decrease by one. For the purposes of this task, a car includes vans, trucks, buses, motorbikes and utility vehicles. Be careful not to mark bushes or other non-vehicles as cars."

Figure 6:
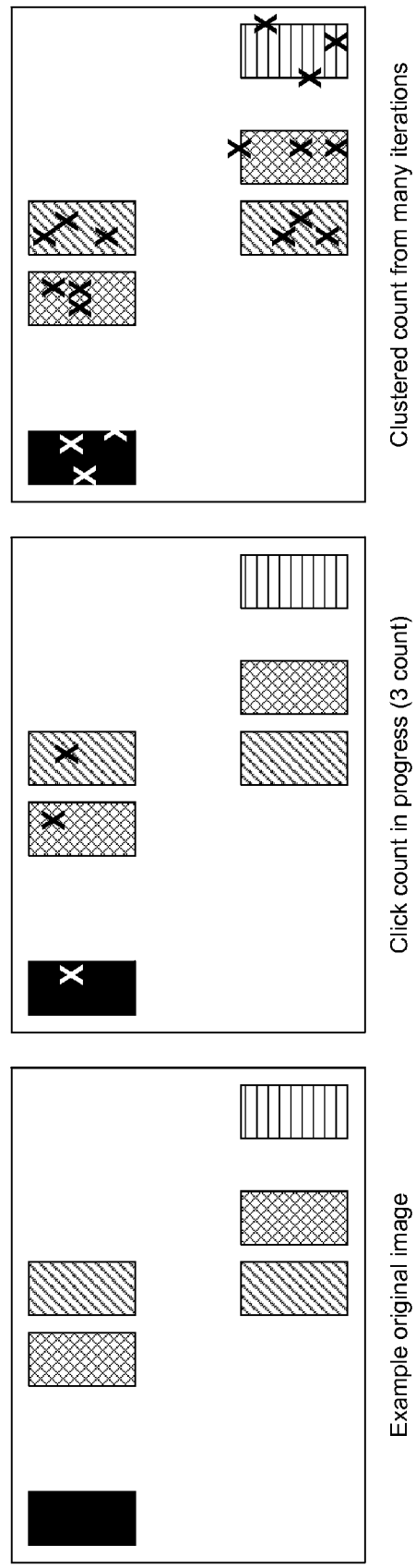
FIGS. 6a-6c illustrate examples of click interface images for counting cars in a parking lot, according to one embodiment.

The click interface 530 overlays a visual mark on an area of an image whenever a worker clicks on that area of the image. This overlay is called a click map and is used in the statistical analysis subsystem 460. FIGS. 6a-6c illustrate examples of click interface images containing these marks. These marks show which objects (e.g., cars) have been counted and which are still to count. FIG. 6a shows the original image before any marks have been overlaid. FIG. 6b shows a click count in progress, where three marks have been added. FIG. 6c shows multiple click counts obtained from different workers overlaid to illustrate a clustered count.

The click interface 530 may have additional behaviors embedded within it. In some cases, the behaviors include rules which dictate behavior for adding click marks. For example, click marks may be required to be a minimum distance apart, corresponding to reasonable distances given the expected size of objects (e.g., cars) being counted and the relative resolution of the image. The click interface may also include measurement behaviors, for example measuring the time between clicks for a worker. If the worker clicks on an area and then changes his or her mind 560, the click interface allows the marks to be erased or removed. When the worker is satisfied with the count 570, the count is submitted to the system 580 and the worker presentation presents the worker with the next image to be counted.

Statistical Analysis

Figure 7:
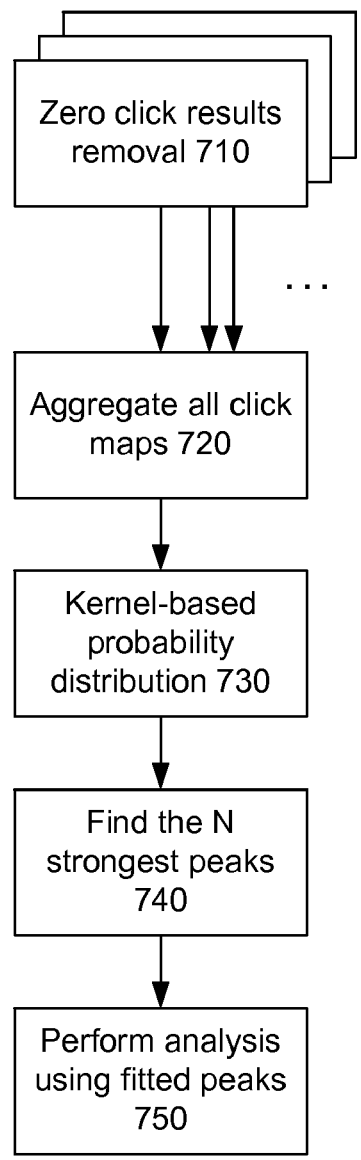
FIG. 7 shows a decision flow for statistical analysis, according to one embodiment.

FIG. 7 shows a flowchart for performing a statistical analysis on resulting counts and click maps from all of the workers counting a particular image, according to one embodiment. Worker results that included no clicks are removed 710. The remaining click maps including one or more clicks are aggregated together 720, and are referred to as click clouds. Ideally, click clouds are tightly clustered together over actual objects. However, poor worker performance or difficulties encountered by workers due to poor image quality, even after image processing, can cause click clouds to be dispersed with respect to actual objects. The centroid of each click clouds is determined, as well as the two-dimensional standard deviation from this centroid. In one case, the centroid and its standard deviation of each click cloud is determined by fitting a two-dimensional kernel-based probability distribution function 730 to the click cloud. Other methods for estimating probability distributions, including both one-dimensional and three-dimensional distribution functions, such as parametric methods can be applied to click clouds. In one specific example, the kernel may be a Gaussian type exponential function with the width of the function proportional to the typical size of the object of interest. In the counting cars example, the width of the function is proportional to the typical size of a car. Statistical rules about the typical geometry of vehicles enforce physically realistic car location estimates.

Processing (not shown) may also include determining confidence factors associated with specific workers, where the data underlying the confidence factors is gathered from previous work performed by the worker. In one example, the amount of time spent on tasks by a worker is positively correlated with a higher confidence score. In these cases confidence factors can be used to weight the contribution of the clicks to the determination of the centroid and standard deviation of the probability density function.

In some cases, other statistical analysis such as the correlation between different worker's results with respect to the same task are summarized into a single confidence score or estimate of variance in the ultimate result of the counted or quantified task (e.g., the variance in the total number of cars in the parking lot). In some cases, if the confidence score is low enough (e.g., the variance is high enough), the system automatically acquires additional imagery 166 or additional workers on the image to improve the resulting derived data.

For each fitted click cloud, the number of clicks within the standard deviation is counted and the top N strongest peaks in the distribution are determined 740. Which N peaks are determined to be the strongest peaks may be determined in a number of different ways. In one case, the number of strongest peaks N is determined from the number click clouds where at least 25% of the total number of clicks are within the standard deviation of the fitting function. Thus, in the car counting example, this would indicate that at least 25% of the total clicks were within a region proportional to the width of a car. In other cases, the number of strongest peaks N may be based on criteria thresholds such as the average, median, or standard deviation in the number of clicks per object of interest, or any combination thereof. The requirements for being included as one of the N strongest peaks by increasing or decreasing any of the criteria thresholds listed above.

In one case, the top N strongest peaks leads directly the final count, such that the final count is equal to N.

Click and count statistics may be used to test and improve the accuracy of automated (no human-in-the-loop) image analysis systems 750. The filtered results are used to compare with automated image analysis systems (for evaluation and/or training) or combined with automated image analysis results. The filtered results may be used as computer learning training sets to guide and improve automated image analysis results. In some cases, automated image analysis results are used directly as the final count, instead of relying on HIT click analysis.

Click and count statistics may also be used to improve future results 750. Click cloud densities are useful for discovering images and portions of images where worker counts disagree. Medium or low density click clouds corresponding to potential objects are suspect. This information may be provided as feedback to the image acquisition or image enhancement subsystems for alteration. For example, as a result of the feedback, the image acquisition or image enhancement subsystems may alter the imagery containing the object to increase the contrast of the object so that it can be more clearly identified.

The results of click counts from the altered imagery may be compared with the original to see if the density of the click cloud increases (potentially indicating a real object) or decreases (potentially indicating a false positive). The impact of the imagery alteration on high-density click clouds is used in a feedback loop to control various image enhancement and processing steps 165. If the click clouds of altered imagery become saturated to the point where previously independent click clouds merge, then the alteration is considered too strong, and feedback is provided to reduce the alterations. Likewise, if the density of all the click clouds falls dramatically, then the alteration is also considered too strong, and feedback is provided to reduce the alteration. However, if the density of the click clouds remains relatively unchanged, except for the medium density clouds, then the alteration is maintained, thereby helping discriminate true objects of interest from the background. Examples of alterations to imagery that may be made include, sharpening, resolution, contrast, and color modification to affect the color, shape, and context of objects that appear in an image.

Results over a number of images may be used to evaluate the effectiveness of individual workers. Bias, including overcount and undercount, for a given worker may be determined relative to the mean, median or mode of a count of objects of interest for an image. Bias for a worker may be used to normalize future counts, thereby eliminating the worker's bias. Results may also be used to evaluate the quality of a given image. The quality of an individual image may be compared and quantified by the standard deviation in the click clouds, as well as by the overall count.

Certainty about whether an object is an object of interest or merely part of the background may be determined based on the time between clicks, possibly normalized on a per-worker basis. Object certainty is confirmed by comparing the time distributions for clicks within a cloud to the density of that click cloud. If time between clicks is correlated for the density of the cloud for a given task, for certain workers, groups of workers, certain images, or groups of images, then time distributions are also used as a measure count accuracy.

Non-Spatial Correlation

The count results from the image analysis are used in a number of different ways. The count (e.g., cars in the store parking lot) may be compared with meaningful, but not necessarily spatial data (e.g., weekly revenues in the store). By building up a correlation history between counts and non-spatial data, future counts can be used to predict future non-spatial data. Alternatively, future non-spatial data can be used to predict future counts. In some cases, counts can be translated into the occurrence of events, or other types of analogous results that are not counts specifically. This data can then be compared with non-spatial data, to extrapolate future results or non-spatial data. The density of the click clouds provides a measure of accuracy or certainty about the count. The certainty may be factored into the prediction of the non-spatial data as a confidence score attached to any predicted future results or non-spatial data.

Generalization Examples

Although the description above has used the example of counting cars in a parking lot, the system may be used for other tasks as well. Examples include counting a number of items from overhead imagery such as ships in a harbor, shipping containers, trailers, raw materials, construction equipment. Examples of event detection tasks include detecting demolition or creation of buildings, the presence of an object in a region of interest, or a significant change in the landscape. In these cases, the sizes, shapes, and background contrast are different to the counting cars task. For these cases, the decision for the HIT is the presence or absence of an event. In some embodiments the click count interface is useful, however, the statistical analysis is modified to reflect boolean, rather than integer counts.

Quantification tasks include determining the area of water resources, the heights of objects in scenes, the area of agriculture plots. Size, shape, and contrast are different than the above tasks. Rather than using a click interface, a software tool to draw polygons is provided. The statistical analysis is modified to take polygon area and shape as an input, rather than click counts.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for image processing, analysis and correlation of analysis results to non-spatial information useful for commerce and trade through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of correlating features in satellite imagery with economic data, the method comprising:
   under control of an automated imaging system comprising computer hardware:
   receiving input control parameters comprising:
      a textual description of an area of interest, and
      a time range;
   analyzing the received input control parameters to obtain location information of the area of interest;
   retrieving a geographical location corresponding to the obtained location information;
   determining one or more polygons of interest corresponding to the geographical location, wherein a polygon of interest comprises coordinates delineating a boundary containing at least a portion of the area of interest;
   obtaining, from at least one of an image archive or an image collection subsystem, satellite imagery of the area of interest, the satellite imagery comprising a plurality of images, such that:
      a surface area of each of the one or more polygons of interest is covered by the satellite imagery, and
      an acquisition time of the satellite imagery is within the time range;
   automatically processing the satellite imagery, wherein automatically processing the satellite imagery comprises at least one of:
      combining multiple images from the satellite imagery to form a single image,
      selecting a preferred image from the satellite imagery, or
      modifying the satellite imagery to visually enhance portions of the satellite imagery;
   obtaining image analysis information related to the processed satellite imagery, wherein the image analysis information comprises at least one of:
      a quantity of an object of interest in the processed satellite imagery, a boundary of an object of interest in the processed satellite imagery,
a location of an object of interest in the processed satellite imagery,
a size of an object of interest in the processed satellite imagery, or
an indication of an occurrence of an event in the processed satellite imagery; and
automatically determining a correlation between the image analysis information and the economic data.

2. The method of claim 1, the received input control parameters further comprising at least one of:
a textual description of an object of interest to be analyzed in the area of interest,
a textual description of the image analysis information to be obtained,
a frequency with which to obtain the image analysis information,
a frequency with which to obtain the satellite imagery, or
a confidence score of the image analysis information.

3. The method of claim 1, wherein the location information comprises an address of the area of interest and the geographical location comprises latitude and longitude coordinates.

4. The method of claim 1, wherein determining a polygon of interest comprises:
creating a polygon template having a border;
placing the polygon template at the geographical location; and
adjusting a size of the polygon template to contain at least a portion of the area of interest, wherein the border of the adjusted polygon template defines the polygon of interest.

5. The method of claim 1, wherein combining multiple images from the satellite imagery to form a single image comprises at least one of:
using the multiple images from the satellite imagery to create a single image having a higher resolution than any individual image of the multiple images, or
stitching together proximate, adjacent, or overlapping images covering an area to create a single image of the area.

6. The method of claim 1, wherein modifying the satellite imagery to visually enhance portions of an image comprises at least one of:
reducing noise in the satellite imagery,
enhancing contrast in the satellite imagery, or
balancing color in the satellite imagery.

7. The method of claim 1, wherein obtaining image analysis information comprises:
sending the processed satellite imagery to a worker computer;
receiving an object indicator from the worker computer; and
associating the object indicator with a property of an object of interest in the satellite imagery, wherein the property comprises a size, a quantity, a location, or a presence.

8. The method of claim 1, wherein determining a correlation between the image analysis information and the economic data comprises deriving a relationship between a value of the economic data with a property of an object of interest in the satellite imagery, wherein the property comprises a size, a boundary, a quantity, a location, or a presence.

9. The method of claim 1, further comprising:
generating a correlation history between prior economic data and prior image analysis information; and
predicting future economic data or future image analysis information based at least partly on the correlation history.

10. The method of claim 1, further comprising:
receiving updated input control parameters;
obtaining updated satellite imagery corresponding to the updated input control parameters;
obtaining updated image analysis information; and
determining a correlation between the updated image analysis information and the economic data.

11. A system for correlating features in satellite imagery with economic data, the system comprising:
computer hardware comprising a physical processor, the computer hardware programmed to execute:
a location search subsystem configured to:
receive input control parameters comprising a textual description of an area of interest and a time range,
analyze the received input control parameters to obtain location information of the area of interest, and
retrieve a geographical location from a data source corresponding to the obtained location information;
an image acquisition subsystem configured to:
determine one or more polygons of interest corresponding to the geographical location, wherein a polygon of interest comprises coordinates delineating a boundary containing at least a portion of the area of interest; and
obtain satellite imagery of the area of interest, the satellite imagery comprising a plurality of images, such that:
a surface area of each of the one or more polygons of interest is covered by the satellite imagery, and
an acquisition time of the satellite imagery is within the time range;
an image analysis subsystem configured to:
process the satellite imagery by at least one of:
combining multiple images from the satellite imagery to form a single image, selecting a preferred image from the satellite imagery, or modifying the satellite imagery to visually enhance portions of an image; and
obtain image analysis information related to the processed satellite imagery, wherein the image analysis information comprises at least one of:
a quantity of an object of interest in the processed satellite imagery,
a boundary of an object of interest in the processed satellite imagery,
a location of an object of interest in the processed satellite imagery,
a size of an object of interest in the processed satellite imagery, or
an indication of an occurrence of an event in the processed satellite imagery; and
an economic data subsystem configured to determine a correlation between the image analysis information and the economic data.

12. The system of claim 11, wherein the location search subsystem is configured to receive feedback from the image acquisition subsystem, the feedback comprising updated input control parameters.

13. The system of claim 12, wherein the feedback is provided responsive to a determination that the one or more polygons of interest extends outside of the obtained satellite imagery.

14. The system of claim 11, wherein the location search subsystem is configured to receive feedback from the economic data subsystem, the feedback comprising updated input control parameters.

15. The system of claim 14, wherein the feedback is provided in response to a determination that the image analysis information is insufficiently correlated with the economic data.

16. The system of claim 11, wherein to determine the one or more polygons of interest, the image acquisition subsystem is configured to:
   create a polygon template having a border;
   place the polygon template at the geographical location; and
   adjust a size of the polygon template to contain at least a portion of the area of interest, wherein the border of the adjusted polygon template defines the polygon of interest.

17. The system of claim 11, wherein the image analysis subsystem is further configured to:
   send the processed satellite imagery to a worker computer,
   receive an object indicator from the worker computer, and
   associate the object indicator with a property of an object of interest in the processed satellite imagery, wherein the property comprises a size, a boundary, a quantity, a location, or a presence.

18. The system of claim 11, wherein the economic data subsystem is further configured to determine predicted economic data based on the image analysis information and a correlation between prior economic data and prior image analysis information.

* * * * *